United States Patent
Berger (10) Patent No.: US 10,136,343 B2
(45) Date of Patent: Nov. 20, 2018

(54) METHOD AND SYSTEM FOR TESTING NETWORK'S DATA TRANSMISSION PERFORMANCE

(71) Applicant: Rohde & Schwarz GmbH & Co. KG, Munich (DE)

(72) Inventor: Jens Berger, Riedholz (CH)

(73) Assignee: Rohde & Schwarz GmbH & Co. KG, Munich (DE)

(*) Notice: Subject to any disclaimer, the term of this patent is extended or adjusted under 35 U.S.C. 154(b) by 126 days.

(21) Appl. No.: 15/250,782

(22) Filed: Aug. 29, 2016

(65) Prior Publication Data
US 2017/0150380 A1    May 25, 2017

(30) Foreign Application Priority Data
Nov. 23, 2015   (EP) .................................... 15195815

(51) Int. Cl.
| | |
|---|---|
| H04W 24/04 | (2009.01) |
| H04B 17/00 | (2015.01) |
| H04L 12/26 | (2006.01) |
| H04W 24/08 | (2009.01) |
| H04W 76/02 | (2009.01) |
| H04W 76/15 | (2018.01) |
| H04W 24/02 | (2009.01) |

(52) U.S. Cl.
CPC ........ H04W 24/04 (2013.01); H04B 17/0087 (2013.01); H04L 43/0894 (2013.01); H04W 24/02 (2013.01); H04W 24/08 (2013.01); H04W 76/15 (2018.02)

(58) Field of Classification Search
None
See application file for complete search history.

(56) References Cited

U.S. PATENT DOCUMENTS

| | | | |
|---|---|---|---|
| 7,430,179 B2* | 9/2008 | Towns-von Stauber | ................... H04L 1/20 370/252 |
| 7,916,658 B2* | 3/2011 | Balan | ...................... H04L 43/00 370/235 |
| 8,767,557 B1* | 7/2014 | Vivanco | .................. H04L 43/10 370/232 |
| 9,503,245 B1* | 11/2016 | Choi | ..................... H04L 5/0028 |
| 2008/0059848 A1 | 3/2008 | Pei et al. | |
| 2011/0069619 A1* | 3/2011 | Voit | ..................... H04L 41/0253 370/248 |
| 2014/0022932 A1* | 1/2014 | Park | ....................... H04W 36/14 370/253 |

(Continued)

FOREIGN PATENT DOCUMENTS

WO    WO2006032125 A1    3/2006

*Primary Examiner* — Candal Elpenord
(74) *Attorney, Agent, or Firm* — Potomac Technology Law, LLC (57) ABSTRACT

An approach for testing performance of a data transmission between a first node and a second node of a data communications network is provided. A permanent test connection is established between the first node and the second node. One or more additional test connections are established, as a temporal connections, between the first node and the second node, according to a predefined time duration test pattern, in parallel with the permanent test connection, in order to achieve an increased accumulated data throughput over the permanent and temporal test connections.

17 Claims, 7 Drawing Sheets

(56) References Cited

U.S. PATENT DOCUMENTS

| | | | |
|---|---|---|---|
| 2014/0052825 A1 | 2/2014 | Luecke et al. | |
| 2014/0188412 A1* | 7/2014 | Mahajan | G06F 1/3206 |
| | | | 702/63 |
| 2015/0189525 A1 | 7/2015 | Schmidt et al. | |
| 2015/0264591 A1* | 9/2015 | Baeder | H04W 24/08 |
| | | | 370/252 |
| 2015/0296508 A1* | 10/2015 | Fan | H04W 72/0446 |
| | | | 370/329 |
| 2016/0338068 A1* | 11/2016 | Cheng | H04W 28/08 |

* cited by examiner

METHOD AND SYSTEM FOR TESTING NETWORK'S DATA TRANSMISSION PERFORMANCE

RELATED APPLICATIONS

This application claims the benefit of the earlier filing date under 35 U.S.C. § 120 of European Patent Application No. EP15195815.4 (filed on 2015 Nov. 23), the entirety of which is incorporated by reference herein.

FIELD

The present invention relates to a method for testing a data transmission performance between a first network node and a second network node in a network and a system thereof. More specifically, the present invention relates to a data transmission speed test system and method, where data transmission performance tests are used to test data transmission speeds between nodes of a network, such as a wireless communications network.

BACKGROUND

Today's approaches for testing network data transmission performance are realized by downloading data files from a server with a user's equipment (UE). Such test approaches are known as "speed tests" and are available as computer programs, applications on the UE or as web-based services.

In the patent publication US 2008/0059848 A1 a data transmission speed test system is described in which a test file is uploaded and downloaded between different network nodes of a data communications network. The time duration for uploading and downloading of the test file is measured. The transmission speed is calculated based on the test file size and the time duration for downloading and/or uploading.

Often, the uploading and the downloading is combined in a sequential test, where at first the test file is downloaded or uploaded and afterwards the opposite direction is used. There are test applications that apply a short pre-test for choosing the best performance or closest hosting server for the speed test.

The state of the art performance tests are restricted to the downloading and uploading of the test files, either partially or completely, or for predefined time durations. Depending on the test file size and/or the predefined test duration, those tests cause high data traffic and/or will deliver results for a short time only.

Especially for high-speed mobile networks, a longer speed test will lead to a large data volume transmitted only for the purpose of speed testing. The observation of a longer period or the seamless repetition of those tests will cause heavy loads for the tested network and the respective network nodes. In case of mobile application, the excessive or automated use of those data transmission performance tests will utilize significant volumes of bandwidth, reducing the available user or subscriber bandwidth and thereby adversely affecting network performance for the users or subscribers in the network.

What is needed, therefore, is an approach for testing data transmission performance in a network without overly consuming network resources and thereby minimizing adverse impact on available bandwidth and network performance for user/subscriber network data communications and services.

SOME EXAMPLE EMBODIMENTS

Embodiments of the present invention advantageously address the foregoing requirements and needs, as well as others, by providing approaches for testing data transmission performance in a network without overly consuming network resources and thereby minimizing adverse impact on available bandwidth and network performance for user/subscriber network data communications and services.

In accordance with example embodiments of the present invention, a method for testing a data transmission performance between a first network node and a second network node of a network is provided. The method comprises establishing a permanent test data connection between the first network node and the second network node. The method further comprises establishing at least one additional temporal test data connection between the first network node and the second network node according to a predefined test pattern, for a defined time duration, in parallel to the permanent test connection to achieve a higher data throughput when accumulating all test connections compared to the permanent test connection.

By way of example, a test connection may be an established communication connection between different network nodes on which data is transmitted, and where the data comprises test data of a known size.

By way of further example, a permanent test connection may be a test connection in which data is transmitted via a continuous data flow between network nodes, where the bitrate of the permanent test connection does not exceed a defined limit during the test performance time duration, which may be defined as time duration between a start time and a stop time of the performance test.

According to a further embodiment of the method, at least one additional parallel and temporal test connection may be established between the first network node and the second network node, where a data throughput of the accumulated test connection of all parallel test connections is higher than the throughput of the permanent test data connection. By way of example, the time duration of the temporal test connection is significantly smaller than the time duration of the permanent test connection (e.g., 10 times, or 100 times, smaller).

Such embodiments thereby facilitate testing of the performance of the network without a permanent high loading of the connection between the first network node and the second network node.

By way of further example, the method can be assumed as constant floor in data transmission, and additional parallel short term data transmissions that are superimposed to the constant floor data transmission. Thus, instead of causing constantly high data flow by having parallel connections active all the time, these high or maximum throughputs are only established during superimposed pulses that are added. In the analysis, an interpolation between the pulses is estimated as the same result as continuous parallel connections.

According to a further embodiment of the method, the permanent test connection between the first network node and the second network node is restricted in bit rate to a predefined limit. By way of example, the predefined limit may be based on the time at which the test is performed, the actual network load and/or the number of active subscribers in the network to assure a stabile function of the network without imposing adverse effects on the network subscribers. Such embodiments thereby ensure that the network is not overloaded by applying the data transmission performance test, and facilitate seamless repetitions of the performance tests without imposing overly heavy traffic loads on the network.

According to a further embodiment of the method, the permanent test data connection is a unidirectional data connection from the first network node to the second network node (or from the second network node to the first network node), and the temporal test connection is a unidirectional data connection from the second network node to the first network node (or from the first network node to the second network node). By way of example, the unidirectional connections are established in opposite directions. Such embodiments thereby separate upload and download connectivity between different test connections, which further relaxes the network load.

According to a further embodiment of the method, the at least one temporal test connection changes direction in an alternating manner, or according to a predefined test pattern. Such embodiments thereby facilitate application of the data transmission performance test to an actual load situation in the network.

According to a further embodiment of the method, the permanent test connection changes direction in an alternating manner, or according to a predefined test pattern (e.g., in a synchronous manner with the temporal test connection, or in a synchronous manner in opposite directions). With such embodiments, therefore, the upload and download data transmission performance test does not overload the network.

Accordingly, with such example embodiments, the permanent test connection is combined with at least one additional temporal test connection, whereby a single continuous data connection lasts over the entire test duration as the permanent data connection, and the additional test connections are activated in parallel temporarily following a predefined pattern. Such example embodiments thereby facilitate the testing of network data transmission performance over longer observation periods, with reduced loading of the network by sparse transmission performance testing, and further, the testing of continuity of data delivery is thereby combined with tests for high and maximum throughput rates.

According to a further embodiment of the method, an analysis of the data transmission performance is made separately for the time duration in which the temporal test connection is activated, and for the time duration in which the permanent test connection is activated. Activation herein means that the test connection is established and data is transmitted between the network nodes over this test connection. The continuity and the high-speed rates can thereby be tested separately, and can be interpolated to obtain the final test results.

According to a further embodiment of the method, the analysis includes accumulating the throughput of all test data connections, and estimating the maximum capacity of the networks data transmission performance for a single data connection between the first network node and the second network node based on the accumulated throughput.

As previously mentioned, the method for testing can be considered as a superposition of a constant data flow transmission and additional temporal short-term data transmissions. By way of example, the temporal test connection is pulse-wise superimposed to the constant floor data transmission. Accordingly, instead of producing a constant high data flow by having parallel connections active all the time, the peak maximum throughputs are only provided during the superimposing pulses. By way of example, the pulse width of the at least one additional temporal test data connection can be varied over the test duration of the permanent test data connection.

According to a further embodiment of the method, one or more of the first network node and the second network node is a single data server or a single user equipment (UE).

According to a further embodiment of the method, the network is a mobile communications wireless network, such as an LTE-based mobile communications network or a UMTS-based communications network.

According to a further embodiment of the method, one or more of the first network node and the second network node consist of a plurality of data servers and/or a plurality of UEs, where the transmission performance test results are accumulated across the plurality of data servers and/or the plurality of UEs. This allows for testing of overall data transmission performance in the network, which may be independent from UE equipment performance and a single data server. In such a case, the overall network can be tested based on a load condition or a time condition of the network.

According to a further embodiment of the method, at least a second temporal test connection is established between the first network node and the second network node, according to a predefined test pattern, for a defined time duration, in parallel to the permanent test connection, and in parallel to the temporal test connection, to achieve a higher data throughput when accumulating all test connections compared to the permanent test connection. By way of example, the number of additional test connections can be greater than 2, greater than 5, or greater than 10. This allows for the establishment of parallel temporal test connections in order to relax the data load on the network, and to split the traffic to different network nodes.

According to a further embodiment of the method, the at least one additional test connection is a pulse-wise test connection that is superimposed to the permanent test connection. The pulse width of each pulse as well as the durations between each single pulse might vary and might follow a specific predefined test pattern.

According to a further embodiment of the method, the data transmission performance test is a network speed test, where the time duration for transmitting a certain amount of test data is analyzed.

In accordance with further example embodiments of the present invention, a system for testing the performance of a network is provided. The system comprises a first network node and a second network node, wherein the system is configured to establish a permanent test data connection between the first network node and the second network node. The system is further configured to establish at least one additional temporal test data connection between the first network node and the second network node, according to a predefined test pattern, for a defined time duration, in parallel to the permanent test connection, to achieve a higher data throughput when accumulating all test connections compared to the permanent test connection. The system further comprises an analyzing means that is configured to perform a data transmission performance test separately for the time duration in which the temporal test connection is activated, and for the time duration in which only the permanent test connection is activated.

According to a further embodiment of the test system, the permanent test connection comprises a constant data flow during the complete data transmission performance test duration, where the test duration time is defined by a test start time and a test stop time of the data transmission performance test.

According to a further embodiment of the test system, the temporal test connection comprises a predefined number of data flow pulses during the complete data transmission performance test duration time, and each data flow pulse comprises a significantly smaller time duration compared with the complete data transmission performance test duration time.

The example embodiments of the test system achieve the same advantages and technical effects as the example embodiments of the method, as described above.

Further, according to example embodiments of the present invention, each network node and component described herein can be implemented in software or hardware, or any combination thereof.

Further, all steps that are performed by the various entities described herein, as well as the respective functions performed thereby, is intended to mean that the respective entity is adapted to or configured to perform the respective steps and functions. Further, even if, in the following description of specific embodiments, a specific function or step to be performed by an entity is not reflected in the description of a specific detailed embodiment of that entity, it will be clear for a person of ordinary skill in the art that the respective method step(s) and/or function(s) could be implemented in respective software or hardware elements, or any combination thereof.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Approaches for testing data transmission performance in a network without overly consuming network resources and thereby minimizing adverse impact on available bandwidth and network performance for user/subscriber network data communications and services, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component (s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 1:
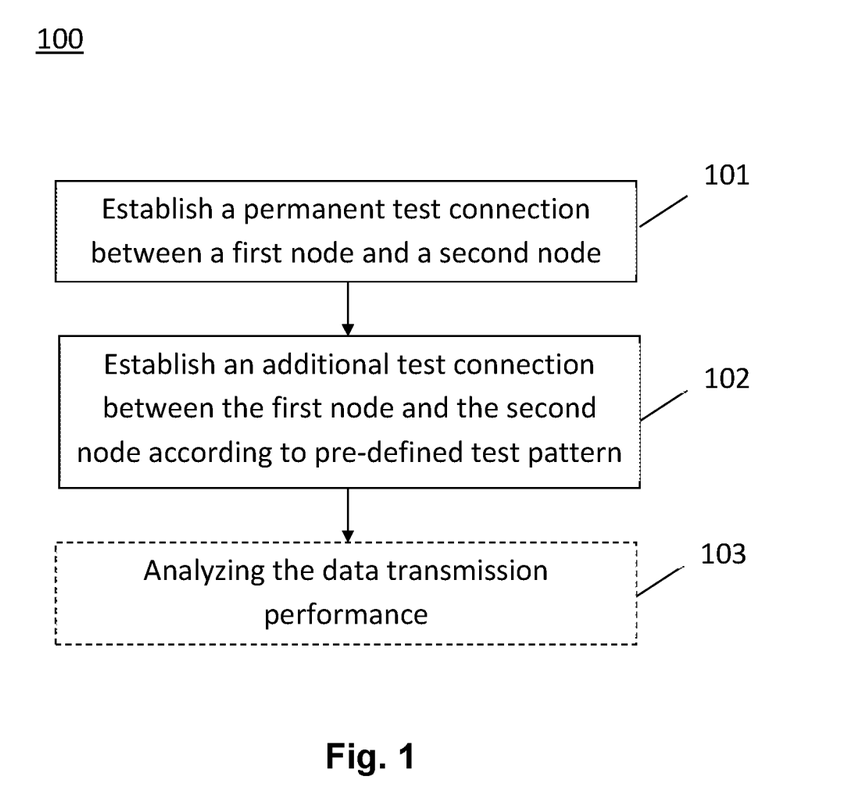
FIG. 1 shows a flow chart of a process in accordance with example embodiments of the present invention.

FIG. 1 shows a flow chart of a process 100 in accordance with example embodiments of the present invention. In step 101, a permanent test connection 4 is established between a first network node 2 and a second network node 3 of the network 1. In step 102, at least one additional temporal or temporary test connection 5, 5' is established between the first network node 2 and the second network node 3 according to a predefined test pattern. In the optional step 103, the data transmission performance is analyzed based on accumulated throughput 6.

Figure 6:
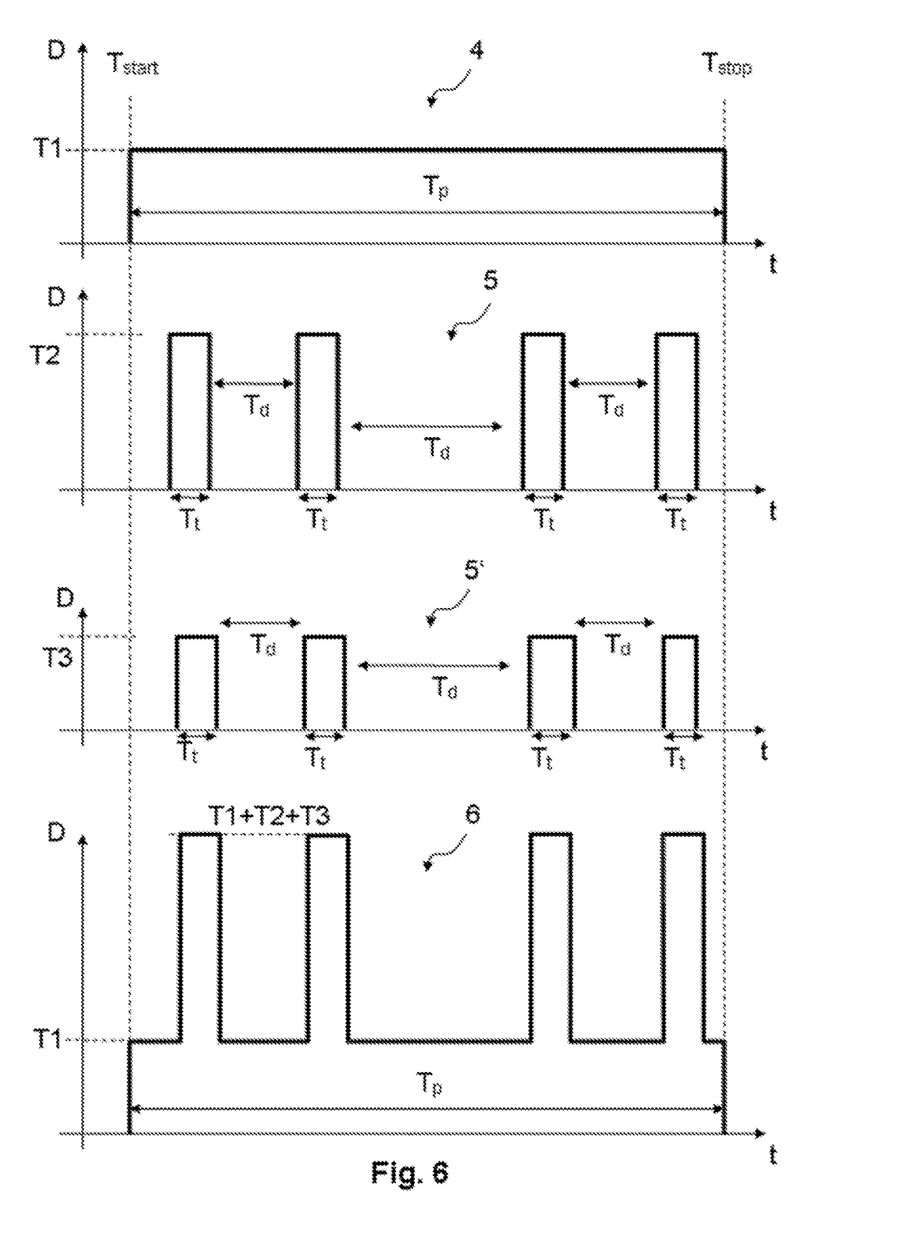
FIG. 6 shows a time diagram illustrating a first example of data throughput for the test connections in accordance with example embodiments of the present invention.
Figure 7:
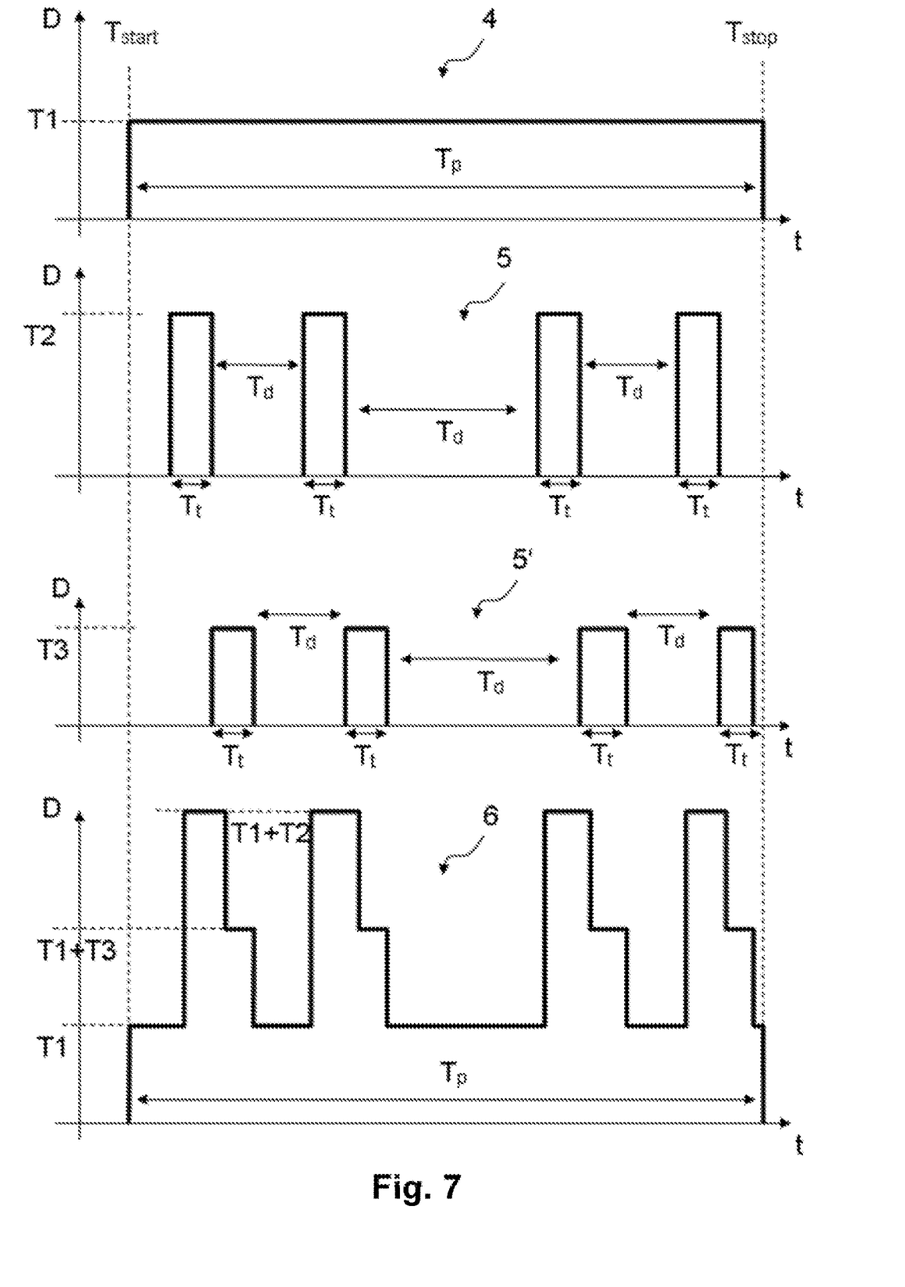
FIG. 7 shows a time diagram illustrating a second example of data throughput for the test connections in accordance with example embodiments of the present invention.

By way of example, the permanent test connection 4 lasts over an entire test duration $T_p$, whereas the at least one additional test connection 5, 5' is activated in parallel, temporarily, following a predefined data pattern (as shown in FIG. 6 and FIG. 7). In the analysis step 103, an interpolation between the pulses of the additional test connection 5 and the permanent test connection 4 is estimated.

Figure 2:
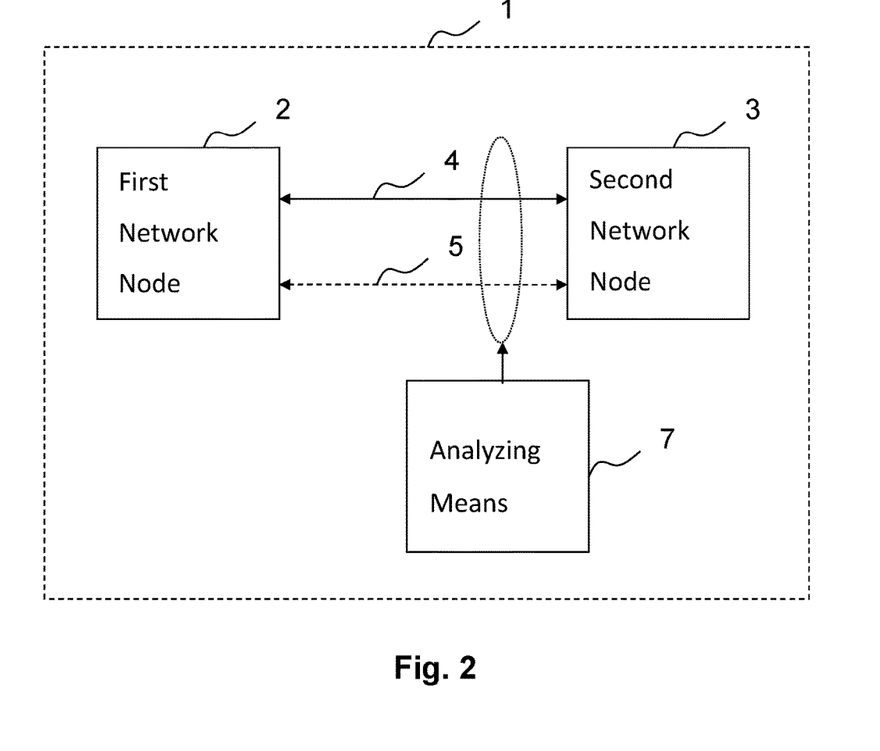
FIG. 2 shows a block diagram of a first example test system in accordance with example embodiments of the present invention.

FIG. 2 shows a block diagram of a first example test system 1 in accordance with example embodiments of the present invention. With reference to FIG. 2, a network 1 comprises a first network node 2 and a second network node 3. The first network node 2 and the second network node 3 establish a permanent data connection 4 between them. By way of example, as shown in FIG. 2, the permanent data connection 4 consist of a bi-directional test connection. The first network node 2 and the second network node 3 further establish an additional temporary or temporal data test connection 5 between them. By way of example, as also shown in FIG. 2, additional temporary or temporal data test connection 5 is established as a bi-directional test connection.

The network 1 further comprises an analyzing means, which, in one embodiment, is configured to accumulate the throughput of the different test connections 4, 5, and to determine the data transmission performance test results based thereon. The data transmission performance test is thereby performed by an accumulation of the permanent data test connection 4 and the additional test connection 5. In a further embodiment, the analyzing means 7 is further configured to predefine a test pattern to establish the additional test connection 5 and/or to re-configure an established test connection. As will be recognized by one of ordinary skill in the art, the analyzing means 7 can be implemented as a stand-alone element, or may be incorporated in one of the network nodes 2, 3, or may be distributed amongst a plurality of the network elements.

According to a further embodiment, the system for testing the data transmission performance can be implemented as a computer-implemented program, which can be stored as an application in a memory of the network nodes 2, 3, such as a data server or a UE (such as a smart phone or any mobile communications device).

Figure 3:
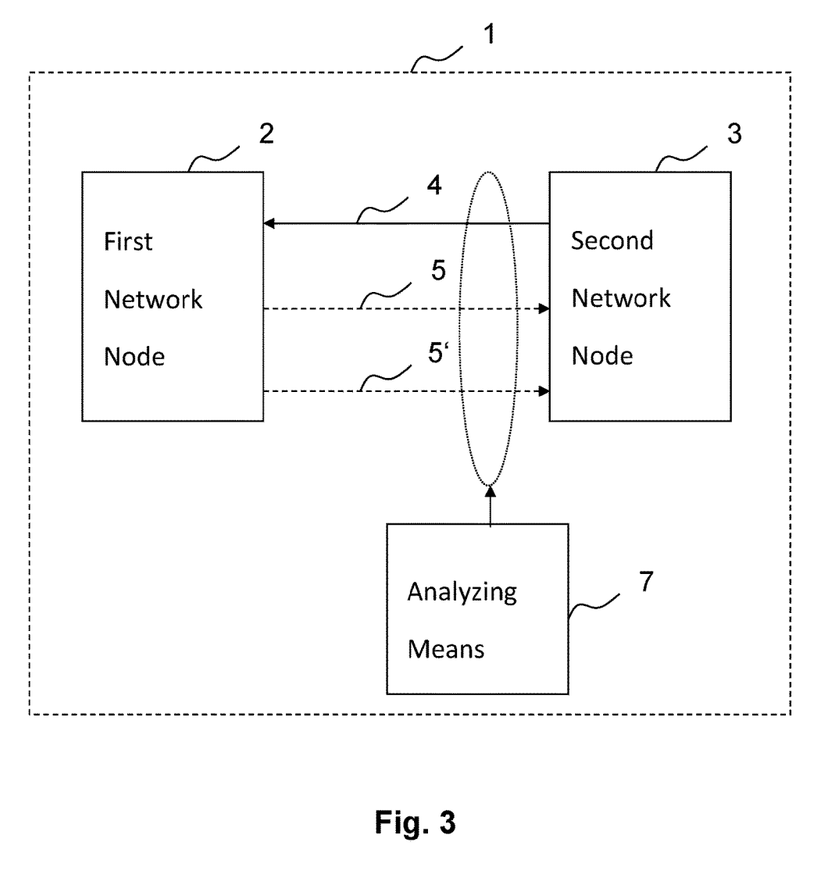
FIG. 3 shows a block diagram of a second example test system in accordance with example embodiments of the present invention.

FIG. 3 shows a block diagram of a second example test system 1 in accordance with example embodiments of the present invention. In comparison to the embodiment of FIG. 2, in the system according to FIG. 3, the network nodes 2, 3 establish a second additional temporal test connection 5' between them. In this embodiment, the analyzing means 7 is configured to accumulate the permanent test connection 4 and both additional test connections 5, 5'. Further, in the embodiment of FIG. 3, the permanent test connection 4 is established as a unidirectional connection from the second network node 3 to the first network node 2, and the temporal test connections 5, 5' are established as unidirectional connections from the first network node 3 to the second network node 2. In this context, the download and upload behavior of the network 1 can be observed or tested on distinct test connections, which relaxes the load on each test connection. By way of example, the directions of the test connections can be varied in an alternating manner in order to cross-check the network nodes 2, 3.

Figure 4:
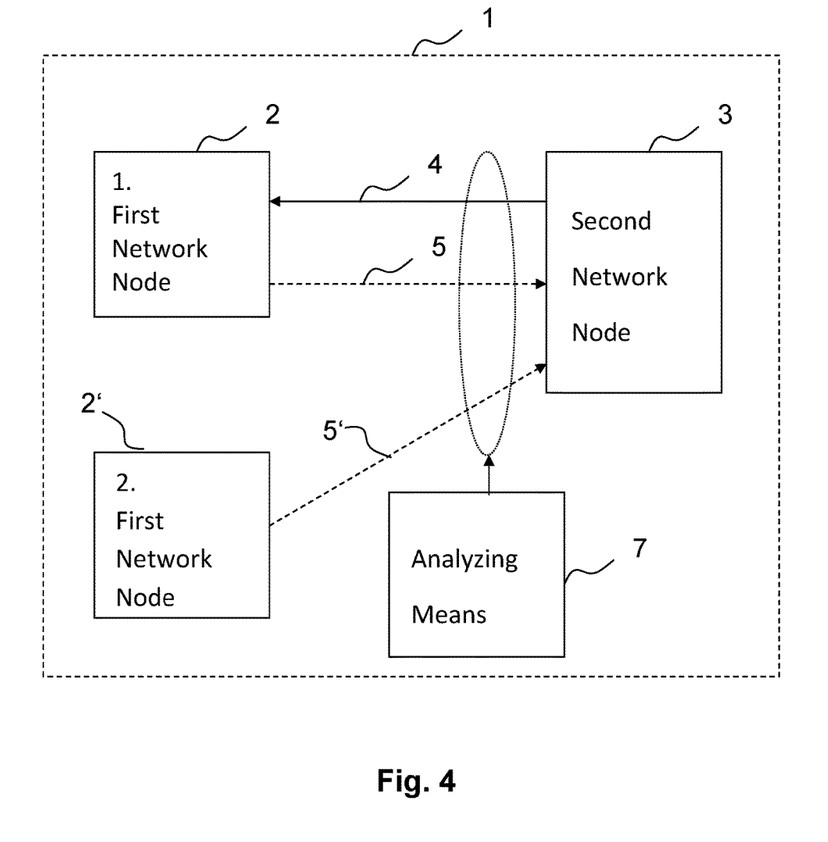
FIG. 4 shows a block diagram of a third example test system in accordance with example embodiments of the present invention.

FIG. 4 shows a block diagram of a third example test system in accordance with example embodiments of the present invention. In contrast to the embodiments of FIGS. 2-3, the first network node 2 is represented as two distinct network nodes 2, 2', whereby a first network node 2 according to different embodiments can consist of a plurality of data server or a plurality of user equipment (UEs). Thus, in order to test the data transmission performance in the network 1, the different test connections (e.g., the permanent test connection 4, and the additional temporal test connections 5, 5') are employed between the different network entities or nodes. By way of example, here also, the directions of the test connections can be varied during the performance test. With reference to the embodiment of FIG. 4, the permanent test connection 4 is established as a unidirectional test connection from the second network node 3 to the first network node 2, the temporal test connection 5 is established as a unidirectional connection from the first network node 2 to the second network node 3, and the temporal test connection 5' is established as a unidirectional connection from the first network node 2' to the second network node 3.

Figure 5:
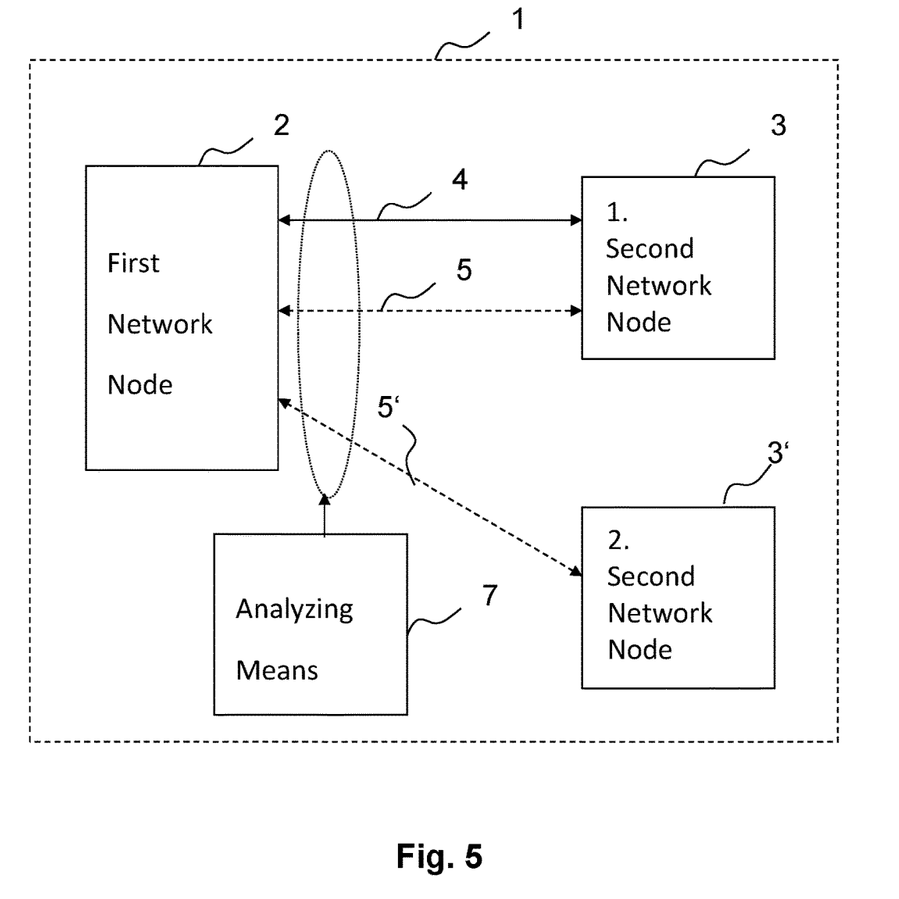
FIG. 5 shows a block diagram of a fourth example test system in accordance with example embodiments of the present invention.

FIG. 5 shows a block diagram of a fourth example test system in accordance with example embodiments of the present invention. In contrast to the embodiments of FIGS. 2-4, the second network node 3 is represented as two distinct network nodes 3, 3', whereby a second network node 3 according to different embodiments can consist of a plurality of data server or a plurality of user equipment (UEs). Thus, in order to test the data transmission performance in the network 1, the different test connections (e.g., the permanent test connection 4, and the additional temporal test connections 5, 5') are employed between the different network entities or nodes. By way of example, here also, the directions of the test connections can be varied during the performance test. With reference to the embodiment of FIG. 4, the permanent test connection 4 is established as a bidirectional test connection between the first network node 2 and the second network node 3, the temporal test connection 5 is also established as a bidirectional test connection between the first network node 2 and the second network node 3, and the temporal test connection 5' is established as a bidirectional connection between the first network node 2 to the second network node 3'.

According to FIGS. 3 and 4, the permanent test connection 4 is established as a unidirectional test connection from the second network node 3 to the first network node 2, and each of the temporal test connections 5, 5' is established as a unidirectional connection from a first network node 2 (or 2' in FIG. 4) to the second network node 3. In contrast, according to FIGS. 2 and 5 the permanent test connection 4 is established as a bidirectional test connection between the first network node 2 and the second network node 3, and each of the temporal test connections 5 (and 5' in FIG. 5) is established as a bidirectional connection between the first network node 2 and the second network node 3 (or 3' in FIG. 5).

FIG. 6 shows a time diagram illustrating a first example of data throughput D for the permanent test connection 4, the first additional test connection 5, and the second additional test connection 5', and an accumulated throughput 6, in accordance with example embodiments of the present invention. The permanent test connection 4 comprises a bitrate threshold limit T1 to limit the data throughput over the test duration $T_p$. By way of example, the test duration $T_p$ lasts from a starting time $T_{start}$ to a stop time $T_{stop}$, where the data throughput D does not exceed the limit T1, which relaxes the load on the network.

Between the start time $T_{start}$ and the stop time $T_{stop}$, the additional test connections 5, 5' are applied in the test performance system. According to the first additional test connection 5, four different blocks of data transmission, with a data throughput D, according to a threshold limit T2, are applied in between the first network node 2 and the second network node 3. The time duration $T_t$ of each block of the temporal test connection 5 can be equal or can vary. In addition, the time durations $T_d$ between the different data blocks can vary according to a predefined test pattern.

Additionally, a second temporal test connection 5' is shown, which comprises four blocks of a duration $T_t$ having a bitrate limit T3.

The accumulated throughput 6 shows that, for the time duration $\tau_p$ of the permanent test connection 4, the threshold limit T1 is not exceeded, except for the time slots in which the additional test connections 5, 5' are established. For this predefined transmission pattern the accumulated throughput 6 has a value of the sum (T1+T2+T3) of all throughputs D of the different test connections 4, 5, 5'. The analyzing means 7 accumulates the test connections 4, 5, 5'.

As is evident from FIG. 6, the maximum speed of the network 1 is tested only during four data blocks, and not over the complete test duration time $T_p$, which is applied between $T_{start}$ to $T_{stop}$. Thus, an observation of the network performance over a longer period does not cause heavy loads for the tested network, or the tested network nodes 2, 3. Thus, in case of mobile applications, the excessive or automated use of those speed tests does not adversely affect other subscribers in the network.

FIG. 7 shows a time diagram illustrating a second example of data throughput for the test connections in accordance with example embodiments of the present invention. In contrast to FIG. 6, the blocks of the second additional test connection 5' are time shifted, which causes an accumulated throughput 6 that has several bit rate steps.

In FIG. 7, the accumulated throughput 6 shows that, for the time duration $T_p$ of the permanent test connection 4, the threshold limit T1 is not exceed, except for the time slots in which the additional test connections 5, 5' are established. For this predefined transmission pattern the accumulated throughput 6 has different values that are repeated stepwise, such as the sum (T1+T2) of the permanent test connection limit T1, and the first additional temporal test connection T2, as well as the sum (T1+T3) of the permanent test connection limit T1 and the second additional temporal test connection 5'.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for testing performance of a data transmission between a first node and a second node of a data communications network, the method comprises:
    establishing a permanent test connection between the first node and the second node; and
    establishing one or more additional test connections, as a temporal test connections, between the first node and the second node, according to a predefined time duration test pattern, in parallel with the permanent test connection, in order to achieve an increased accumulated data throughput over the permanent and temporal test connections; and
    wherein a time duration of at least one of the one or more additional temporal test connections is at least ten times lower than a time duration of the permanent test connection.

2. The method according to claim 1, wherein the permanent test connection between the first network node and the second network node is restricted in bitrate to a predefined limit.

3. The method according to claim 1, wherein the permanent test connection is a unidirectional data connection from the first network node to the second network node, and at least one of the one or more additional temporal test connections is a unidirectional data connection from the second network node to the first network node.

4. The method according to claim 1, wherein the at least one of the one or more additional temporal test connections changes direction in one of an alternating manner or according to a predefined test pattern.

5. The method according to claim 4, wherein the permanent test connection changes direction in one of an alternating manner or according to a predefined test pattern.

6. The method according to claim 5, wherein the permanent test connection changes direction in a synchronous manner with at least one of the one or more additional temporal test connections.

7. The method according to claim 1, wherein the method comprises:
    analyzing the data transmission performance separately for a time duration during which at least one of the one or more additional temporal test connections is active and for a time duration during which the permanent test connection is active.

8. The method according to claim 7, wherein the analysis comprises:
    accumulating data throughput of all the test connections; and
    estimating a maximum capacity of data transmission performance of the communications network for a single data connection between the first node and the second node based on the accumulated data throughput.

9. The method according to claim 1, wherein each of one or more of the first node and the second node is a single data server or a single user equipment (UE) device.

10. The method according to claim 1, wherein each of one or more of the first node and the second node is a plurality of data servers or a plurality of UE devices, and the analysis of the data transmission performance comprises accumulating data throughput across the plurality of data servers and UE devices.

11. The method according to claim 1, wherein the method further comprises:
establishing at least a second test connection, as temporal connection(s), between the first node and the second node, according to a predefined time duration test pattern, in parallel with the permanent test connection and in parallel with the one or more additional temporal test connections, in order to achieve an increased accumulated data throughput over the permanent, additional temporal and second temporal test connections.

12. The method according to claim 1, wherein a number of additional temporal test connections is greater than 2.

13. The method according to claim 1, wherein a number of additional temporal test connections is greater than 5.

14. The method according to claim 1, wherein a number of additional temporal test connections is greater than 10.

15. The method according to claim 1, wherein at least one of the one or more additional temporal test connections is a pulse-wise test connection that is superimposed with respect to the permanent test connection.

16. The method according to claim 1, wherein the data transmission performance test is a network speed test, and a time duration for transmitting a certain amount of test data is analyzed.

17. A system for testing performance of a data transmission between a first node and a second node of a communications network, the system comprising:
a first node and a second node of the communications network; and
a processor; and
wherein the first node and the second node are configured to establish a permanent test connection between the first node and the second node,
wherein the first node and the second node are configured to establish one or more additional test connections, as a temporal test connections, between the first node and the second node, according to a predefined time duration test pattern, in parallel with the permanent test connection, in order to achieve an increased accumulated data throughput over the permanent and temporal test connections,
wherein the processor is configured to analyze the data transmission performance separately for a time duration during which at least one of the one or more additional temporal test connections is active and for a time duration during which the permanent test connection is active, and
wherein the time duration of the at least one of the one or more additional temporal test connections is at least ten times lower than the time duration of the permanent test connection.

* * * * *